United States Patent [19]
Nonaka et al.

[11] 3,940,999
[45] Mar. 2, 1976

[54] SHOCK SENSOR

[75] Inventors: Kohei Nonaka, Tokyo; Masayoshi Fukushima; Kunio Sakai, both of Sakai, all of Japan

[73] Assignee: Asahi Kasei Kogyo Kabushiki Kaisha, Osaka, Japan

[22] Filed: Apr. 7, 1975

[21] Appl. No.: 565,968

[30] Foreign Application Priority Data
Apr. 8, 1974  Japan.............................. 49-39706

[52] U.S. Cl. ......................................... 73/516 LM
[51] Int. Cl.² ........................................ G01P 15/08
[58] Field of Search ..... 73/515, 516 LM, 71.2, 492; 116/114 AH; 340/262; 200/61.47

[56] References Cited
UNITED STATES PATENTS

| | | | |
|---|---|---|---|
| 2,068,389 | 1/1937 | Smith.................................. | 215/350 |
| 2,776,829 | 1/1957 | Cockram ............................ | 73/515 |
| 3,015,958 | 1/1962 | Dove................................... | 73/516 LM |
| 3,249,248 | 5/1966 | Metzendorf........................ | 215/334 |
| 3,684,118 | 8/1972 | Brumme ........................... | 215/320 X |
| 3,696,957 | 10/1972 | Van Baarn......................... | 215/320 |

*Primary Examiner*—James J. Gill
*Attorney, Agent, or Firm*—Sughrue, Rothwell, Mion, Zinn & Macpeak

[57] ABSTRACT

A liquid passageway is formed in a vessel and is filled with liquid, which flows in response to a shock or an acceleration applied to the vessel, and signal detection means produces an electrical signal in accordance with the velocity of the liquid flow. Threshold presetting means is disposed within the liquid passageway on one side of the signal detection means, and permits a passageway of the liquid therethrough only for a liquid pressure which exceeds a given value. A check valve is disposed within the liquid passageway on the opposite side of the signal detection means with respect to the threshold presetting means. The check valve permits a flow of the liquid toward the threshold presetting means, but blocks a movement of the liquid in the opposite direction. That amount of the liquid which has moved past the threshold presetting means is returned to the liquid passageway by passing it through a return path so as to flow through the check valve in a forward direction. A signal is produced by the signal detection means only when the vessel is subjected to a shock in excess of a given value.

14 Claims, 25 Drawing Figures

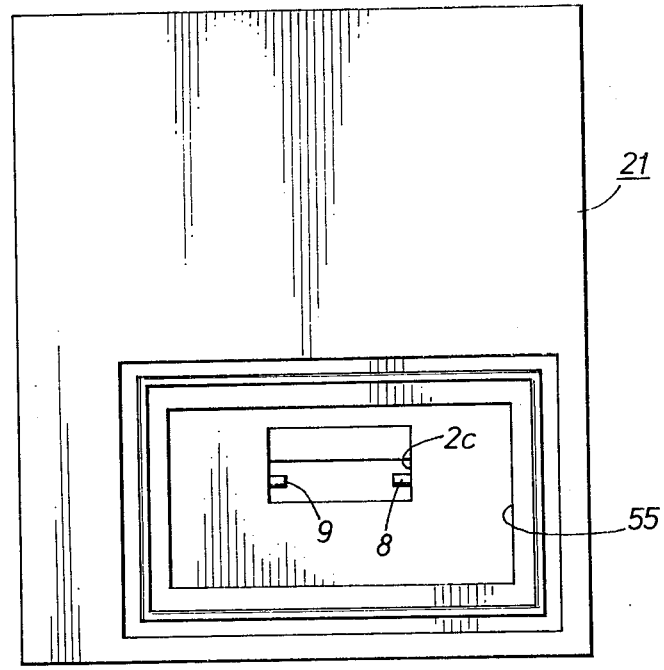
FIG. 9
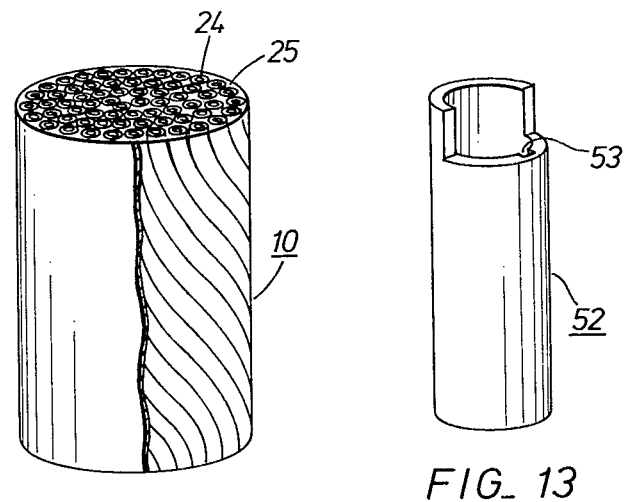
FIG. 10
FIG. 13

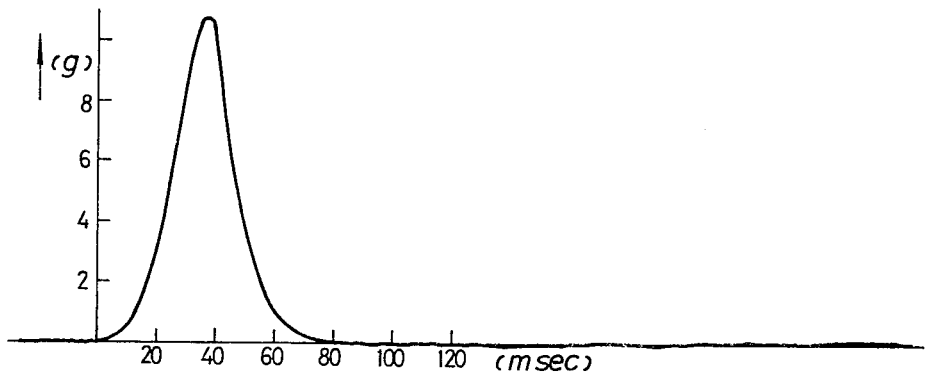
FIG_14A
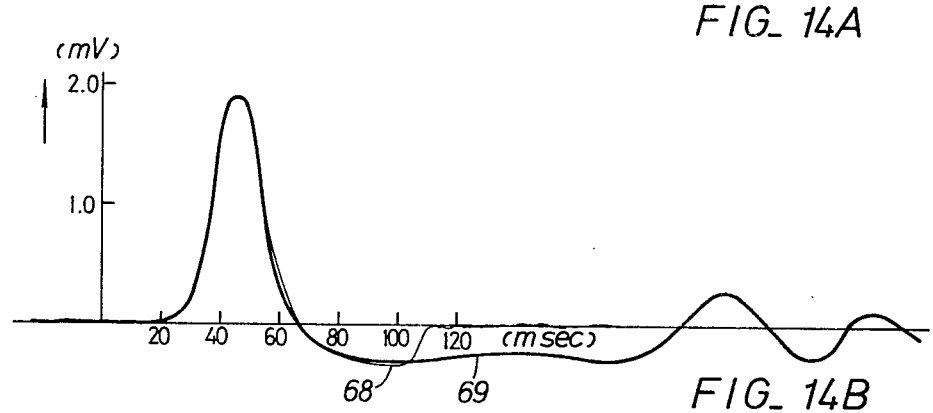
FIG_14B
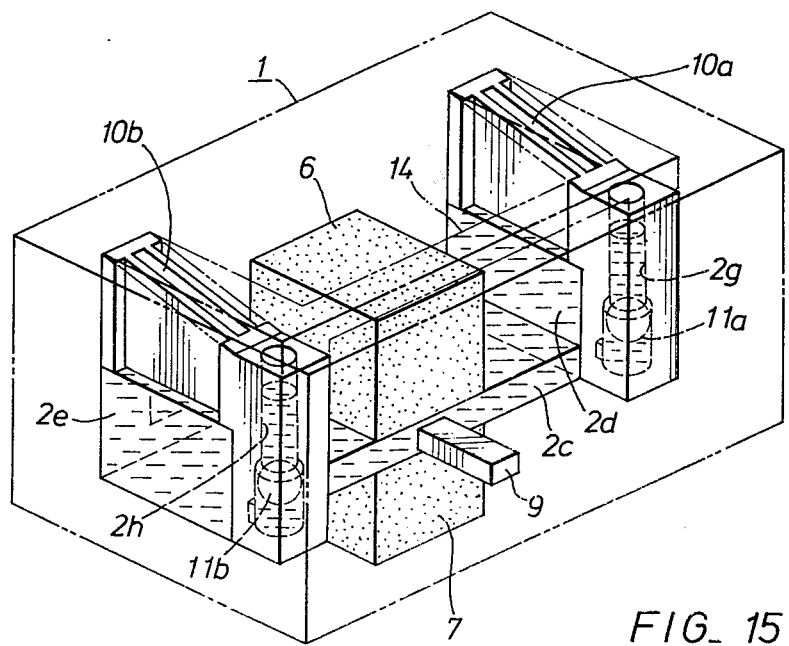
FIG_15

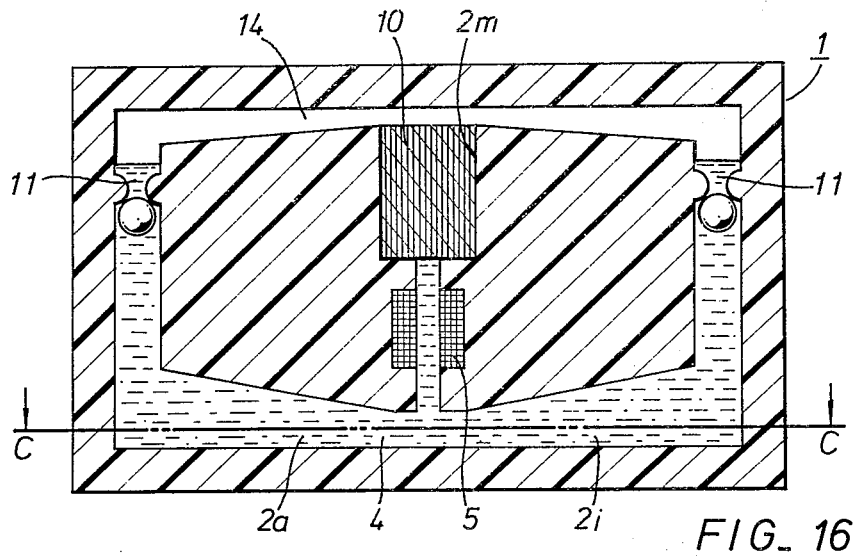
FIG_16
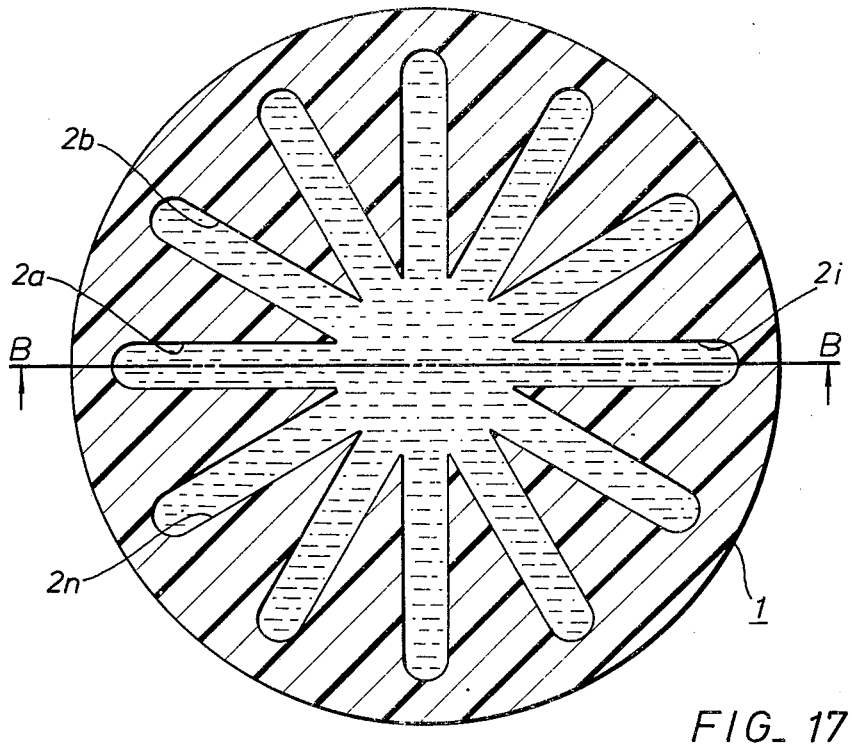
FIG_17

SHOCK SENSOR

BACKGROUND OF THE INVENTION

The invention relates to a shock sensor utilizing liquid, in particular to a shock sensor which is responsive only to shocks of magnitude in excess of a given value.

A number of applications are found for a shock sensor. For example, it may be mounted on an automobile to detect a collision accident to expand an air bag for protection of the life of the occupants. Alternatively, it may be mounted on a glass window or door in order to issue an alarm when the window is destroyed by a thief, by detecting the shocks applied to the pane. A conventional shock sensor comprises a mass of metal which is resiliently biased and which closes an electrical circuit by contact with an oppositely disposed electrode when the mass has moved more than a given distance. This type of shock sensor which depends on the electrical contact is susceptible to the deterioration of contact, resulting in a poor reliability and a reduced useful life. In addition, a resonance may be caused by mechanical vibrations, giving rise to a malfunctioning. Another difficulty is experienced in increasing the sensitivity by reducing the resilience of the spring and increasing the weight of the metal mass, in that a massive metal body can not be properly retained by a spring having a reduced resilience.

Another type of shock sensor is known having a vessel in which a liquid passageway is formed for receiving a body of liquid so that when the vessel is subjected to a shock lengthwise of the passageway, the liquid moves relative to the passageway so as to permit a detection of the shock applied, using the velocity of the liquid flow as a variable. This has an advantage of increasing the detection velocity by detecting the velocity of flow rather than a displacement of a mass. Further advantages are obtained in that the reliability is increased by avoiding a mechanical contact and that unlike a mass-spring system, the resonance which results from vibrations can be shifted out of the frequency band used. Additionally, the magnitude of the shock applied can be determined.

Where a shock sensor is mounted on an automobile for detection of shocks, the air bag must not be expanded in response to shocks of small magnitude since otherwise the expanded bag will block the sight of the driver, causing an even greater accident. When driving on an uneven road, the automobile is subjected to small shocks perpetually, and in such instance, the detection of shocks is not required or preferably should be avoided. This is true also in a collision where the running velocity is not high enough to cause a loss of human life or a serious damage. In view of these facts, it is desirable that only shocks of magnitude in excess of a given value be detected. Similarly, in the application to the detection of a glass window or door being destroyed, it is desired that the shock sensor does not operate in response to shocks occurring when opening or closing the window or door or shocks of the wind, but responds only in response to shocks which are produced when the pane is being destroyed. In consideration of these and other factors, the present inventors has previously proposed the provision of threshold presetting means in a shock sensor utilizing a body of liquid, in which a motion of the liquid is only permitted in response to shocks of magnitude in excess of a given value.

The threshold presetting means may be disposed intermediate the ends of the liquid passageway and constructed such that the liquid can move past the threshold presetting means when the energy of the liquid tending to move in response to a shock exceeds a given value. However, when a shock sensor provided with such threshold presetting means is subjected to a shock in the opposite direction to cause a movement of the liquid in the opposite direction or away from the threshold presetting means and is subjected to a second shock immediately thereafter, there will occur a movement of the liquid unrestricted by the threshold presetting means, thereby resulting in a detection of the shock. Such an event will be experienced on an automobile having its shock sensor arranged so as to detect a collision with a forwardly located object, when a shock of relatively small magnitude is applied to the automobile immediately after it has been bumped from behind to a slight degree. Vibrations experienced on an uneven road may cause a movement of the liquid in a direction away from the threshold presetting means, which may prevent a proper functioning of the latter. In addition, where a continual vibration of the shock sensor occurs when driving on an uneven road, for example, accompanying a corresponding oscillation of the internal liquid, a resonance may be caused, whereby the shock sensor may operate improperly to detect it as a large shock. Where it is desired to provide a uniform detection of shocks from an angular range or from all directions, the liquid passageway is constructed in the form of a plurality of radially extending branch paths which cover the angular extent or all the directions, with their branch points communicating with a common path. A proper detection can be obtained in this instance if the movement of the liquid which occurred in one of the branch paths is transmitted in its entirety to the common path, but the shock to be detected may not be detected if a part of the liquid flow is diverted to another or other branch paths. The above discussions also apply in the application of the shock sensor to the detection of destruction of a glass window or door wherein the application of a shock of a relatively small magnitude applied after the liquid has moved away from the threshold presetting means without passing therethrough may result in a false detection of the destruction of the pane. In addition, a resonance may be caused in the pane in response to vibrations which are caused by the wind.

Therefore, it is an object of the invention to provide a shock sensor utilizing liquid which does not respond to shocks of magnitude less than a given value.

It is another object of the invention to provide a shock sensor of the type described in which a movement of the liquid is prevented for shocks from any direction which are of magnitude less than a given value.

It is a further object of the invention to provide a shock sensor which blocks an ingress of air into the liquid passageway when permitting a movement of the liquid during a return flow of the liquid after its movement has occurred.

It is an additional object of the invention to provide a shock sensor which prevents air from remaining in the liquid passageway when the vessel assumes a proper position subsequent to its positional adjustment.

SUMMARY OF THE INVENTION

In accordance with the invention, a liquid passageway is formed in a vessel, and is filled with liquid. Signal detection means is provided for producing a signal in accordance with the velocity of the liquid flow. Threshold presetting means is disposed within the liquid passageway on one side of the signal detection means, and permits a passage of the liquid therethrough when the energy of the liquid tending to move exceeds a given value. A return path is provided to form a loop with the liquid passageway, and that amount of the liquid which has moved past the threshold presetting means is returned to the liquid passageway through the return path. A check valve is disposed within the liquid passageway on the opposite side of the signal detection means from the threshold presetting means for blocking a movement of the liquid in a direction from the threshold presetting means toward the signal detection means. The check valve does not substantially block a flow of the liquid in a direction from the signal detection means toward the threshold presetting means. The liquid within that portion of the liquid passageway which contains the signal detection means is constrained in its movement by means of the threshold presetting means and the check valve. As a result, only in response to a shock of magnitude in excess of a given value which causes the liquid to move in a direction from the signal detection means toward the threshold presetting means, the liquid is allowed to pass through the threshold presetting means, and the velocity of such liquid flow is detected by the signal detection means. A movement of the liquid is blocked by the check valve when the vessel is subjected to a shock which tends to cause a liquid flow in a direction from the signal detection means toward the check valve. In this manner, the liquid is maintained in contact with the threshold presetting means, so that the latter remains effective.

The threshold presetting means may comprise a blocking member disposed within the liquid passageway and having small apertures or slits formed therein which permit the liquid to pass therethrough only when the liquid pressure exceeds a given value. Alternatively, the threshold presetting means may comprise a valve disposed within the liquid passageway, with the valve being biased by a spring so that the valve may be opened when the pressure applied against the valve exceeds a given value. The check valve suitable for use in the invention may be any one of conventional ones. For example, the liquid passageway may comprise a substantially horizontally extending portion and a vertical portion which connects with one end of the horizontal portion, and a restriction may be formed in the vertical portion with a valve body disposed therein below the restriction so that the buoyancy of the liquid acting on the valve body causes it to abut against the restriction, thus blocking the restriction. A float may be disposed below the valve body in order to increase the buoyancy. The signal detection means may be any one of known various means. Where the liquid is electrically conductive, the signal detection means may be constructed by establishing a magnetic field across the liquid passageway in a direction substantially perpendicular thereto and by disposing a pair of electrodes spaced apart in a direction perpendicular to both the magnetic field and the liquid passageway, thus enabling a voltage to be developed across the pair of electrodes in proportion to the velocity of a liquid flow in the liquid passageway. Alternatively, flow meters of Karman's vortex street type, ultrasonic type or hot-wire type may be used. A liquid reservoir is formed in communication with the liquid passageway, and may be utilized during shipment or storage when the position of the vessel is changed, or inverted, for example, in order to contain the air within the vessel therein, thus leaving the liquid passageway free from air. In this manner, an oxidation of the electrodes used with an electrically conductive liquid which may result from its contact with air can be avoided. In the region of the check valve, flutes may be formed in the liquid passageway so as to extend both upwardly and downwardly from the valve, and is constructed to prevent a penetration of the liquid therein. When the liquid which is returned through the return path passes through the check valve, the air contained therein is vented through the flutes, thus preventing the air from reaching that portion of the liquid passageway which is adjacent to the signal detection means. Where it is desired to detect shocks from an angular range or from all directions, a plurality of liquid passageways may be formed substantially in a single plane with their one end collected together, while their other end is each bent in an upward direction to form a vertical extension within which a check valve is provided. A common vertical path is provided in communication with said one end of the passageways so as to extend upwardly therefrom, and the threshold detection means and the threshold presetting means may be disposed within this common vertical path. A pair of vertical paths may be formed at the opposite ends of a single horizontal path and contain the threshold presetting means and check valve for detection of shocks from the opposite directions.

BRIEF DESCRIPTION OF THE DRAWINGS

FIG. 9 is a left-hand side elevation of the second block;

FIG. 10 is an enlarged perspective view of threshold presetting means;

FIG. 13 is a perspective view of a cylindrical body;

FIG. 14A is a graph showing typical shocks;

FIG. 14B graphically shows the output of the shock sensor;

FIG. 15 is a schematic perspective view of the bidirectional shock sensor according to the invention;

FIG. 16 is a cross section of one embodiment of the all-directional shock sensor of the invention, taken along the line B—B shown in FIG. 17;

FIG. 17 is a cross section taken along the line C—C shown in FIG. 18;

DETAILED DESCRIPTION OF THE PREFERRED EMBODIMENTS

Figure 1:
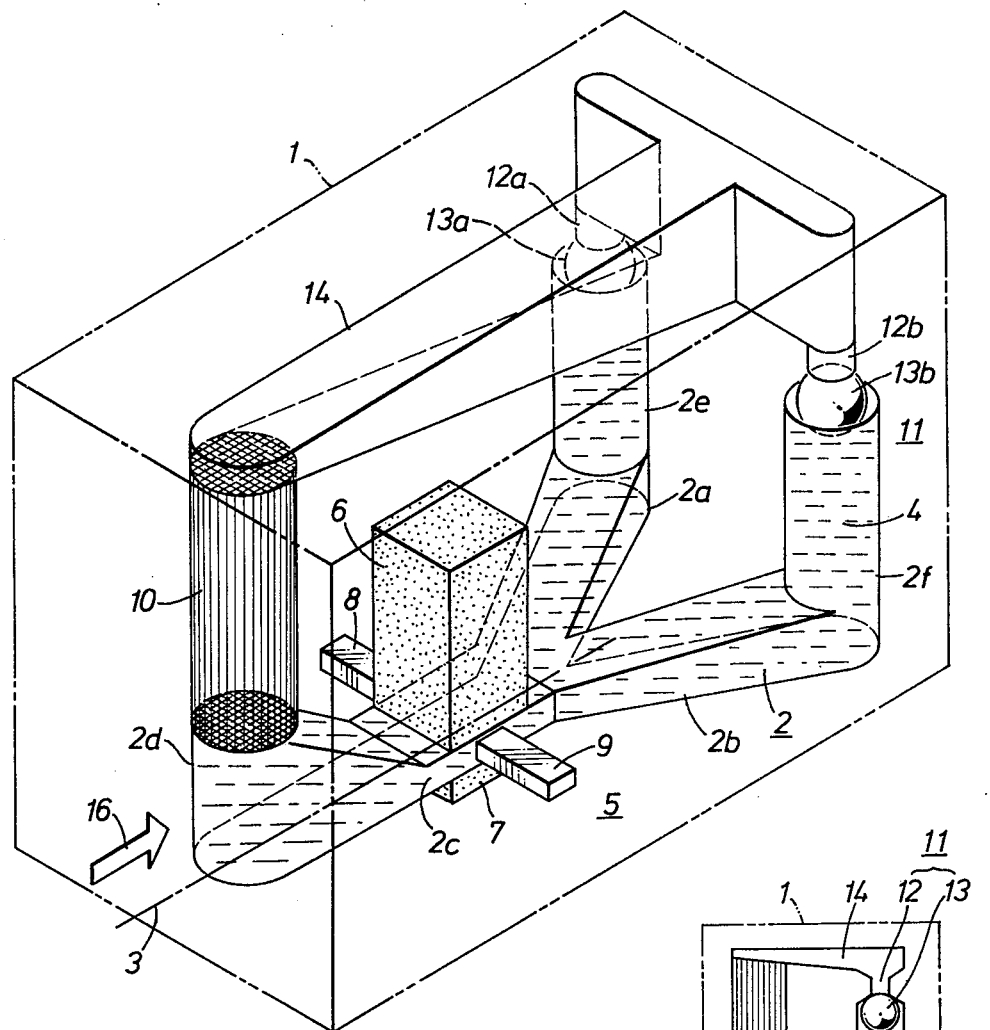
FIG. 1 is a schematic perspective view of one embodiment of the shock sensor according to the invention.

Referring to FIG. 1, a vessel 1 is in the form of a block molded from synthetic resin material, for example, in which a liquid passageway 2 is formed. In the example shown, the shock sensor is arranged so as to be capable of uniformly detecting shocks from an angular range of ±30° with respect to a centerline 3. The passageway includes a pair of branch paths 2a, 2b which extend at an angle of ±20° with respect to the centerline 3 near the bottom of the vessel 1. The branch point of the branch paths 2a, 2b communicates with one end of a common path 2c extending along the centerline 3. The branch paths 2a, 2b and the common path 2c constitute together a horizontal path. The passageway 2 is filled with liquid 4, which is mercury in the present example. Means 5 for producing a signal in accordance with the velocity of flow of the liquid 4 is provided. At this end, a pair of spaced permanent magnets 6, 7 are disposed on opposite sides of the common path 2c so as to be level with the upper and lower surfaces thereof, the magnets 6, 7 having their poles of different polarities facing the path 2c, thus establishing a magnetic field in a direction substantially perpendicular to the length of the passageway 2. In the region of the magnetic field, a pair of electrodes 8, 9 are disposed in the side walls of the path 2c and project therefrom into the path so as to be opposite to each other. While not shown, the electrodes 8, 9 are electrically connected with lead wires which extend to the exterior of the vessel 1.

Threshold presetting means 10 is disposed in one end of the passageway 2. At this end, the end of the common path 2c which is remote from the branch paths 2a, 2b extends in an upward direction to form a vertical path 2d, which is filled with a bundle of hollow fibres 10 extending lengthwise. The lower end of the threshold presetting means 10 which is nearer the common path 2c is normally maintained in contact with the mercury 4, but the mercury is prevented from entering the bundle of fibres by virtue of surface tension. The inner diameter of the fibres in the bundle 10 is determined by the minimum value of shocks to be detected.

A check valve 11 is disposed in the other end of the passageway 2. In the example shown, the branch paths 2a, 2b are extended vertically at their end remote from the common path 2c, thus forming vertical paths 2e, 2f. A pair of restrictions 12a, 12b are formed in the upper end of the respective vertical paths 2e, 2f, and a pair of spherical valve bodies 13a, 13b of a diameter greater than that of the restrictions are disposed within the vertical paths 2e, 2f, respectively, below the restrictions 12a, 12b. The valve bodies 13a, 13b are formed of a material having a specific gravity which is less than that of the liquid 4, for example balls of stainless steel where the liquid is mercury, thus allowing the buoyancy of the liquid 4 to cause the valve bodies 13a, 13b to block the restrictions 12a, 12b from below. Thus, a liquid flow in an upward direction through the respective vertical paths 2e, 2f is prevented, but a liquid flow in the downward direction is permitted, thus forming the check valve 11.

The top end of the vertical path 2d communicates with one end of a return path 14 formed along the upper surface of the vessel 1 so that the liquid 4 which has moved past the threshold presetting means 10 may be returned to the liquid passageway 2 through the check valve 11. The other end of the return path 14 is expanded crosswise generally in T-shape, with the opposite ends of the expanded regions communicating with the upper end of the restrictions 12a, 12b, respectively. In order to achieve a greater velocity of flow in the common path 2c, the upper surface of the branch paths 2a, 2b is inclined so as to be closer to the upper surface of the vessel 1 as the vertical paths 2e, 2f are approached, and the cross-sectional area of the branch paths 2a, 2b is reduced as the common path 2c is approached. To prevent bubbles from remaining within the passageway 2, the upper surface of the common path 2c is inclined upwardly in its region adjacent to the vertical path 2d in the same manner as the branch paths 2a, 2b are inclined. In order to assure a return flow of the liquid 4 which has moved past the threshold presetting means 10 toward the check 11, the bottom surface of the return path 14 is downwardly inclined toward its end nearer the check valve 11. The amount of the liquid 4 filling the liquid passageway 2 is chosen so that the check valve 11 is closed, and the check valve 11 is located to be at a level higher than the liquid level at the interface between the threshold presetting means 10 and the body of liquid 4, thus causing the gravity to urge the liquid 4 into contact with the threshold presetting means 10.

In operation, when a shock indicated by an arrow 16 is applied to the vessel 1 along the common path 2c from the side nearer the vertical path 2d, the vessel 1 tends to move the mercury 4 tends to remain in position, thus resulting in a tendency of the liquid 4 to move toward the threshold presetting means 10 within the passageway 2. However, when the magnitude of the shock applied is less than a given value, the presence of the threshold presetting means 10 prevents a flow of mercury 4. On the other hand, a shock exceeding the given value permits the mercury 4 to pass through the threshold presetting means 10. As a consequence, a voltage is developed across the pair of electrodes 8, 9 in proportion to the velocity of flow of the mercury 4, thus detecting the application of a shock which exceeds the given value.

With the present shock sensor, shocks can be detected in the manner which achieves the previously mentioned objects of the invention. When the vessel is subjected to a shock in the opposite direction from that indicated by the arrow 16, the mercury 4 tends to move toward the vertical paths 2e, 2f, but a reverse flow of the mercury 4 can not occur since the restrictions 12a, 12b are blocked by the valve bodies 13a, 13b. Thus, a movement of the mercury 4 away from the threshold presetting means to thereby lose the function of the threshold presetting means is prevented from occurring in response to a small shock applied in the opposite direction, thus maintaining the body of the mercury 4 in contact with the threshold presetting means 10 so as to enable the threshold presetting means to determine a threshold value. The presence of the branch paths 2a, 2b permits a uniform detection of shocks 16 from directions which lie within an angle of ±30° with respect to the centerline 3. It should be noted that such uniformity can not be achieved without the check valve 11 since then a portion of the mercury flowing from one of the branch paths toward the common path 2c will also flow to the other branch path. However, in the embodiment described, the presence of the check valve 11 prevents the possibility of the mercury flowing from one branch path to the other, and in a practical apparatus constructed in accordance with this embodiment, a uniform detection has been achieved over an angular range as designed. In response to a shock, the mercury 4 enters the bundle of hollow fibres 10 and rapidly leaves it while preventing the oscillation of the mercury 4 within the passageway 2 by the combined action of the bundle 10 and the check valve 11, thus rapidly restoring its initial condition. Where the shock sensor is utilized to expand an air bag, a shock which causes a movement of the mercury but which is not strong enough to cause an expansion of the air bag results in a rapid restoration to the initial condition, so that there is obtained a proper detection of shocks which occur in close succession. Since a proper functioning of the threshold presetting means 10 is assured, a proper detection can be obtained if shocks to be detected is set at a level which is relatively close to that of shocks which need not be detected.

In a performance test, it has been recognized that after passage through the threshold presetting means 10, the mercury 4 flows through the return path 14 and the restrictions 12a, 12b to the branch paths 2a, 2b, rendering the shock sensor to be reusable. The provision of the return path 14 and the check valve 11 assures the operability of the sensor when oriented in its correct position if the position of the sensor is changed during shipment.

Figure 2:
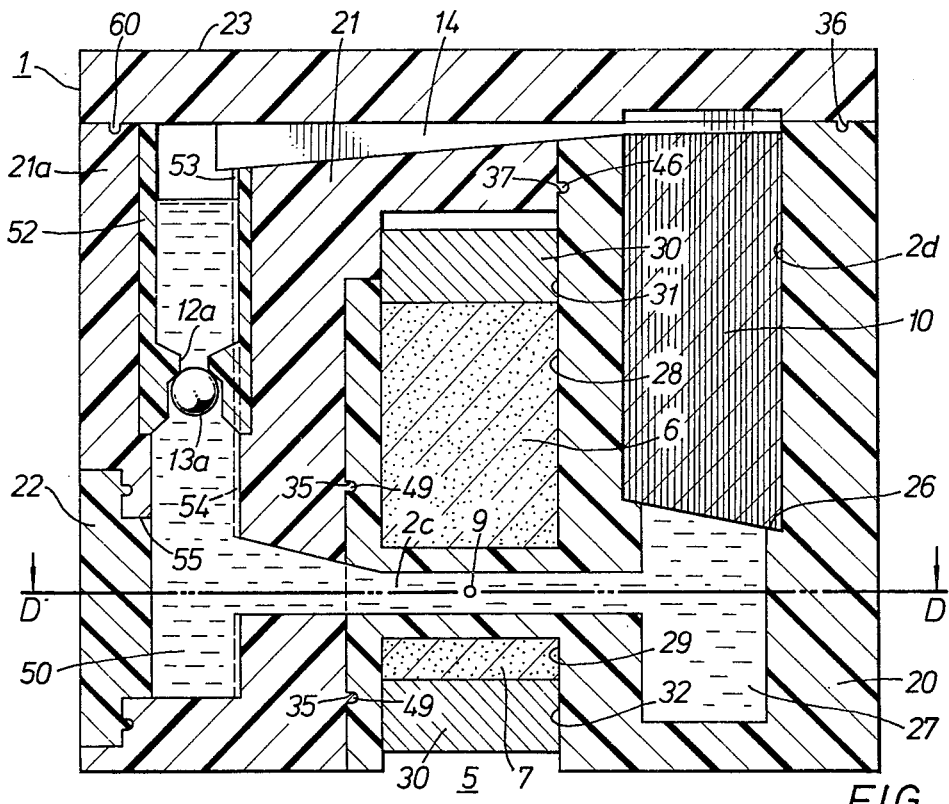
FIG. 2 is a cross section of another embodiment of the shock sensor according to the invention, taken along the line A—A shown in FIG. 5.
Figure 5:
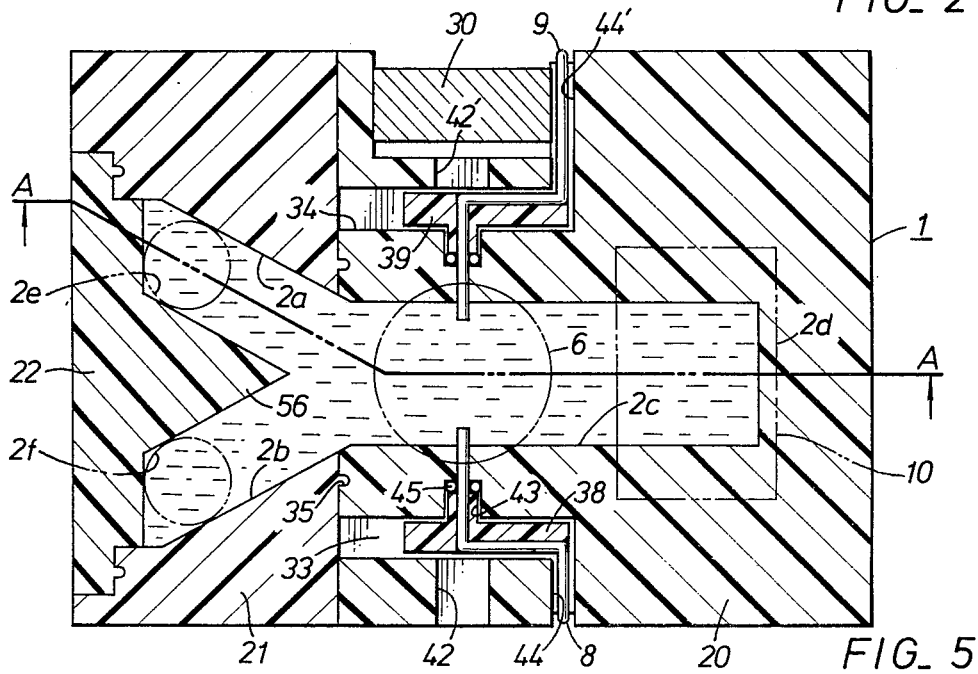
FIG. 5 is a cross section taken along the line D—D shown in FIG. 2.
Figure 3:
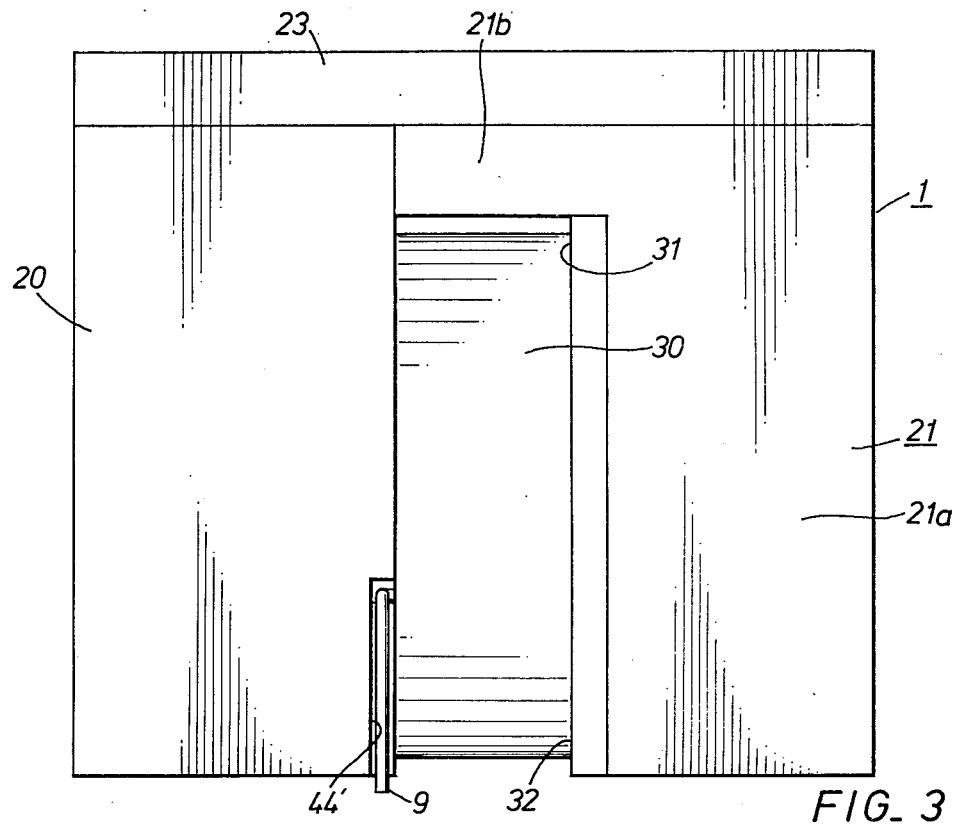
FIG. 3 is a rear view of FIG. 2.
Figure 4:
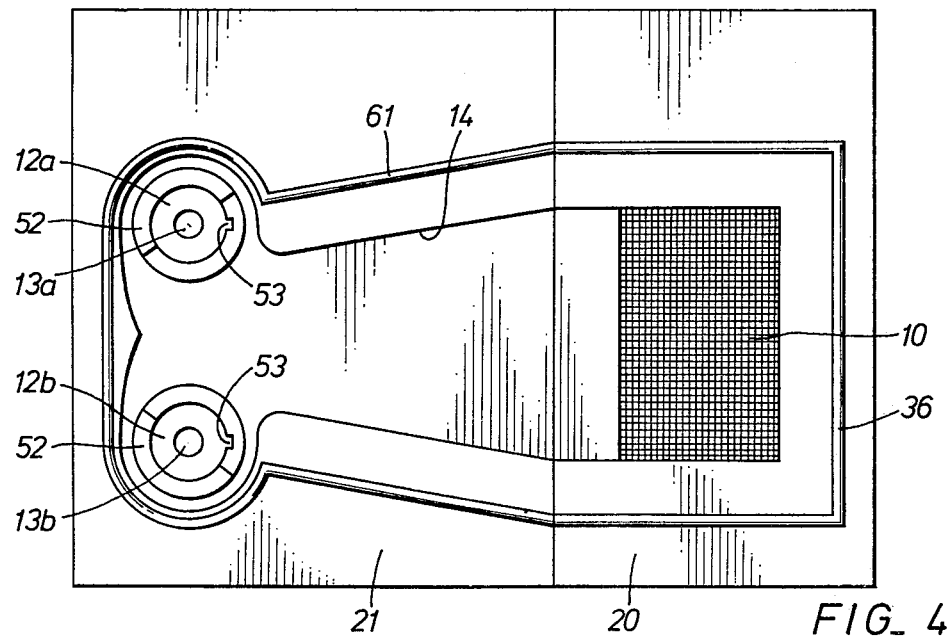
FIG. 4 is a plan view of FIG. 2, with lid being removed.
Figure 6:
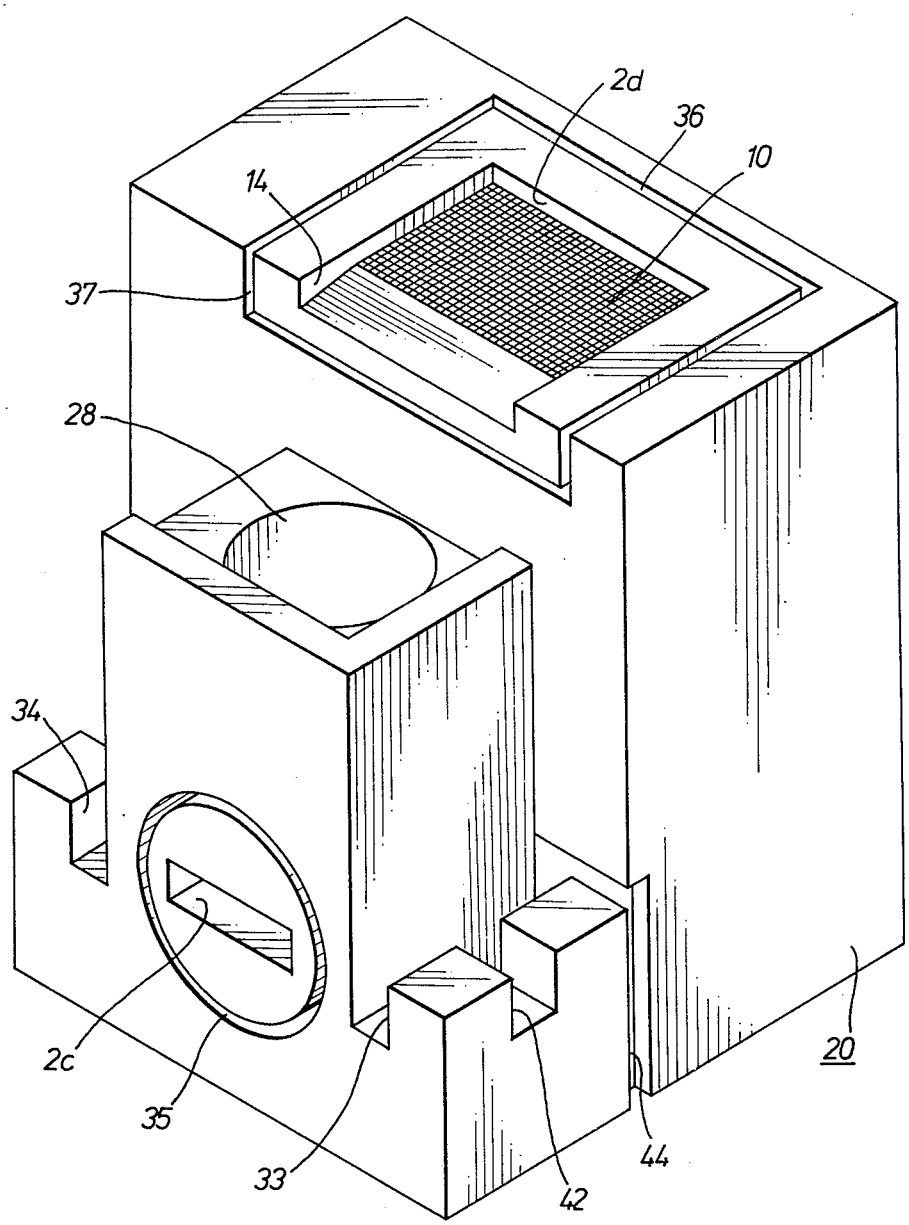
FIG. 6 is a perspective view of a first block of the shock sensor shown in FIG. 2.
Figure 7:
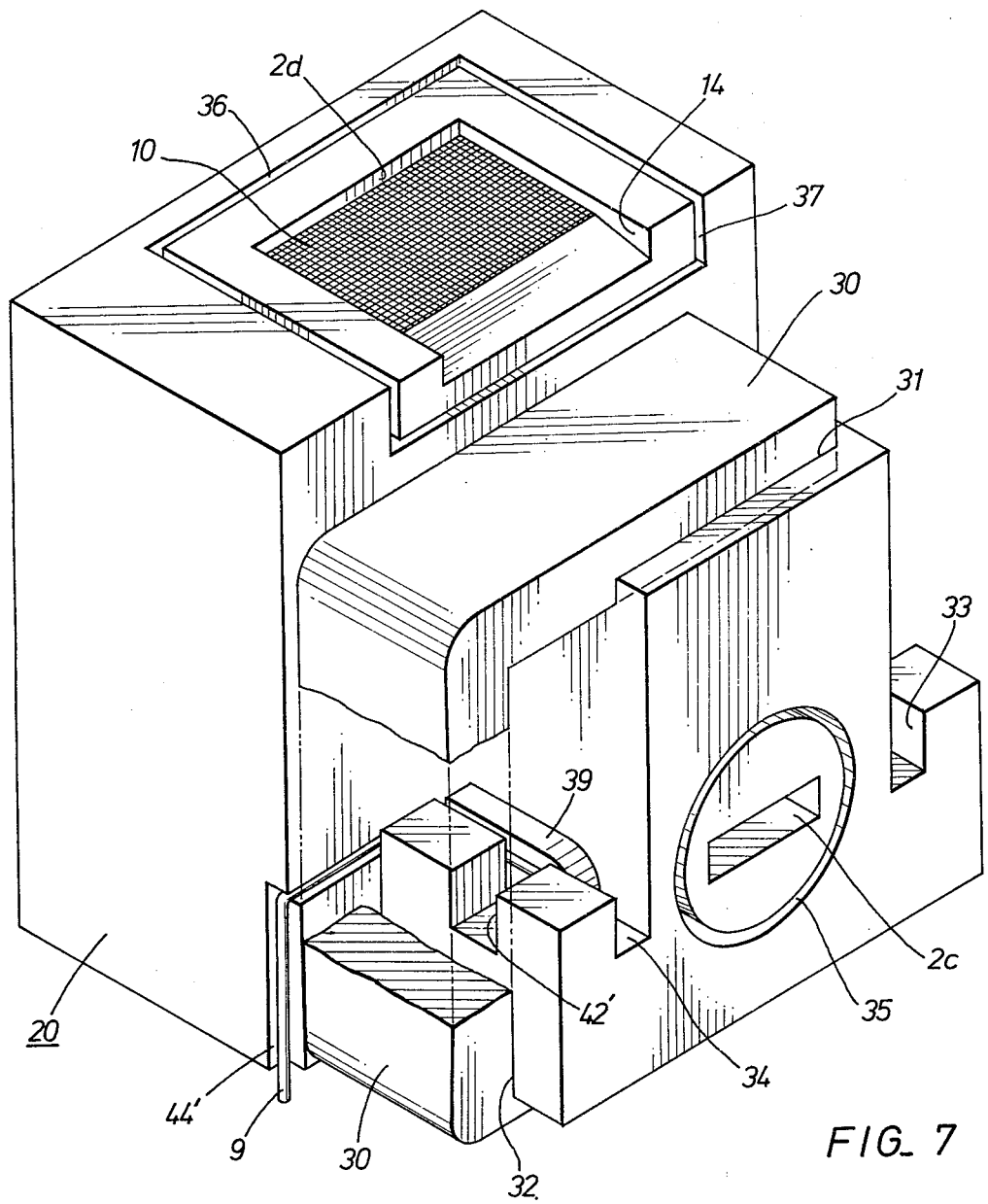
FIG. 7 is a perspective view of the first block with a magnetic yoke mounted thereon, as viewed in the opposite direction from FIG. 6.

FIGS. 2 to 13 show a second embodiment of the shock sensor according to the invention. Specifically, the vessel 1 comprises a first block 20 including a detector 5 and threshold presetting 10, a second block 21 including check valve 11, a third block 22 which is fitted into the second block 21 to form the pair of branch paths 2a, 2b, and a lid 23 which forms the return path 14 together with the first and second blocks 20, 21. As shown in FIGS. 2, 6 and 7, a bore which forms the vertical path 2d is formed in the first block 20 and extends toward the bottom thereof from its top surface, and threshold presetting means 10 is formed in the upper one-half of the bore. In the arrangement shown, the threshold presetting means 10 comprises a bundle of hollow fibres such as polyamide, polyester regenerated cellulose or glass fibres, for example, disposed within the vertical path 2d, these fibres having an inner diameter which prevents an ingress of the liquid at a liquid pressure below a given value. In one example, the inner diameter of the fibres may be on the order of 30 to 70 microns. These fibres can be fabricated with any desired inner diameter uniformly by impregnating the bundle of fibres with a diluted solution in a solvent of a thermosetting resin such as epoxy or phenol resin, for example, and heating them under compression. If the axis of the hollow fibres is arranged parallel to the vertical path 2d, a portion thereof may become removed from the vertical path during a shock test or in response to an external force. To avoid this, the hollow fibres 24 as bundled may be twisted and bonded together by an adhesive 25, as shown in FIG. 10. The bonded bundle may be cut to size, and fitted into the upper one-half of the vertical path 2d which has an increased diameter as shown in FIG. 2, thus forming a shoulder 26. The threshold presetting means 10 comprising an assembly of the hollow fibres has its lower edge disposed in abutting relationship with the shoulder 26, the interface of the threshold presetting means with the liquid 4 being at an angle with the horizontal so as to permit an easy removal of air when charging the liquid 4. Where the liquid 4 comprises mercury, the surface tension is effective to present a resistance to the penetration of mercury into the hollow fibres, but other liquid can also be used by making these hollow fibres from a material which exhibits a suitable repelling property to the liquid.

A transverse bore which forms the common path 2c is formed in the first block 20 so as to extend substantially perpendicularly to and in communication with the lower one-half of the vertical path 2d intermediate its ends, the common path 2c opening through its surface which is located opposite to the second block 21. Thus, the vertical path 2d extends to a position below the common path 2c, thereby forming a liquid reservoir 27. In the forward portion of the first block 20 nearer the second block 21, a bore 28 is formed so as to extend parallel to the vertical path 2d from its top surface toward the common path 2c, and receives a cylindrical permanent magnet 6. In a similar manner, a bore 29 is formed in the bottom of the first block 20 so as to extend close to the common path 2c in opposing relationship with the bore 28, and receives a permanent magnet 7. The top surface of the first block 20 is stepped so as to be lower over the magnet 6 than over the threshold presetting means 10. A U-shaped magnetic yoke 30 is engaged with the upper surface of the magnet 6 and the lower surface of the magnet 7. At this end, a pair of recesses 31, 32 are formed in the top and bottom portions of the first block 20 for receiving the yoke 30. For connection with the second block 21, the lateral sides of the first block in its forward portion in which the detector 5 is arranged are recessed, and a pair of guide grooves 33, 34 extend through the bottom of these recessed portions in a direction parallel to the common path 2c. At its end face facing the second block 21, the first block 20 is formed with a circular groove 35 which surrounds the opening of the common path 2c. A U-shaped groove 36 is formed in the top surface of the rear portion of the first block 20 which is located above the threshold presetting means 10 so as to surround the opening of the vertical path 2d, and communicates with a channel-shaped groove 37 formed in the step between the forward and rearward portions of the first block 20. A sidewall of the vertical path 2d which is located nearer the detector 5 is notched in its top so as to form a part of the return path 14.

As shown in FIG. 5, the pair of electrodes 8, 9 are received in a pair of electrode holders 38, 39 which are of an identical construction. Specifically, referring to FIG. 11, the holder 38 comprises a body 38a having an extension 38b which extends in a direction perpendicular to the plane of the body 38a. A central bore 40 is formed through the extension 38b, and a narrow groove 41 is formed in the surface of the body 38a which is opposite from the extension 38b so as to extend lengthwise thereof, the groove 41 communicating with the bore 40. The electrode 8 is initially inserted into the central bore 40 and then bent at right angles so as to be fitted into the groove 41, and subsequently is bent again in a direction which is substantially perpendicular to both the extension 38b and the groove 41. Referring to FIGS. 5 to 7 and 11, a notch 42 is formed centrally in the outer wall which defines the groove 33, and an electrode insertion opening 43 is formed in the inner wall of the groove 33 in alignment with the notch 42, the opening 43 being reduced in diameter at a position adjacent to the common path 2c. When mounting the holder 38, the electrode 8 is engaged with the holder 38, which is then inserted through the notch 42 while maintaining it in a vertical position, as indicated in phantom lines in FIG. 11. Subsequently, the extension 38b is inserted into the opening 43 so that the tip of the electrode 8 extending through the extension 38b projects into the common path 2c through the reduced diameter portion of the opening 43. Finally, the body 38a is turned toward the vertical path 2d to be fitted within the guide groove 33. Thereupon, the other end of the electrode 8 extends to the exterior of the vessel 1 through a groove 44 cut into the first block 20 in communication with the end of the groove 33. It is to be noted that when inserting the extension 38b into the opening 43, an O-ring 45 is fitted on the electrode 8 to prevent a leakage of the liquid 4. In a similar manner, the electrode 9 is received in the holder 39, which is fitted into the groove 34. A notch 42' corresponding to the notch 42 is formed in the inner sidewall which defines the groove 34. Also a groove 44' corresponding to the groove 44 is formed in communication with the groove 34 for extending the electrode 9 therethrough.

Figure 8:
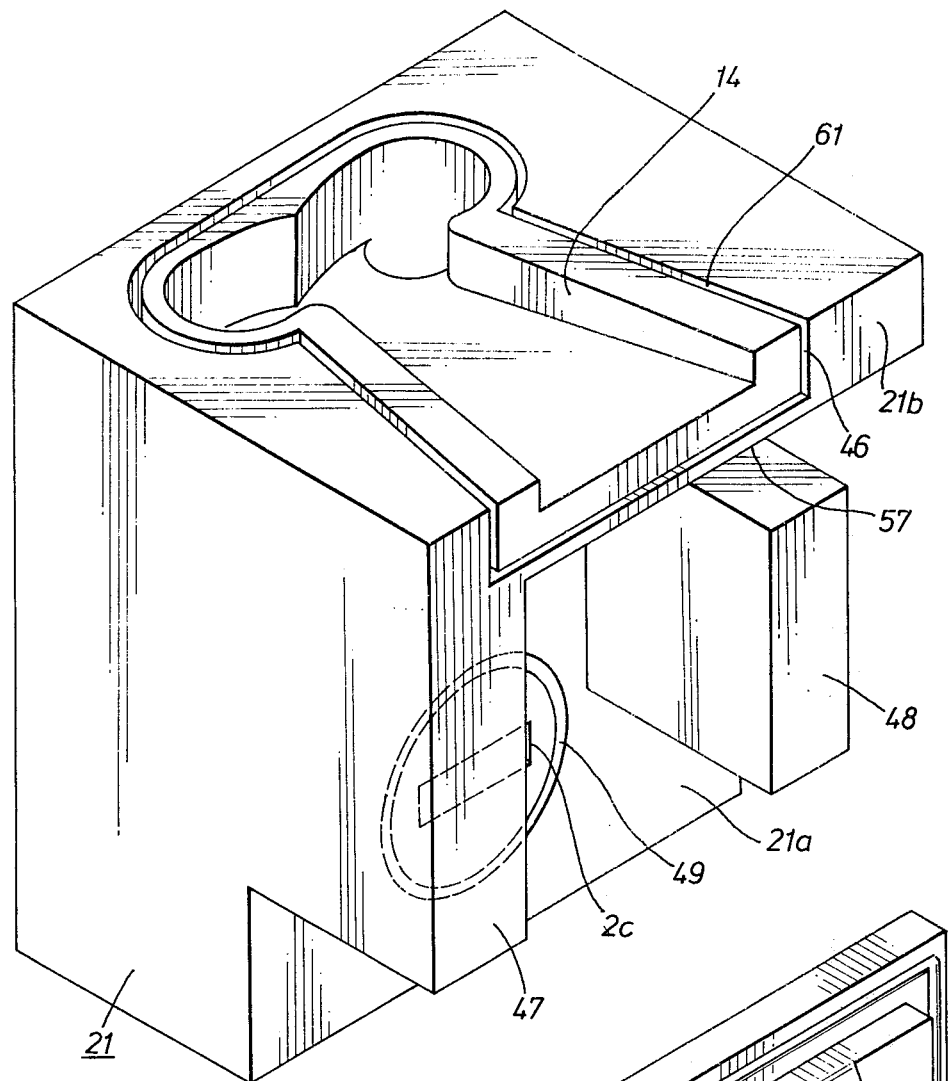
FIG. 8 is a perspective view of a second block.
Figure 11:
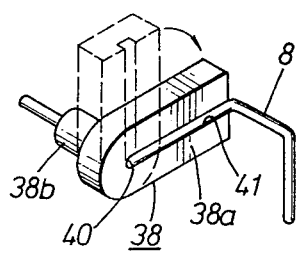
FIG. 11 is a perspective view of an electrode holder.

As indicated in FIGS. 2 and 8, the second block 21 is generally in an inverted L-shape including a vertical leg 21a in which a pair of longitudinal bores are formed extending from the top surface toward the bottom surface, thereby providing the vertical paths 2e, 2f. The second block 21 also includes a horizontal leg 21b which defines the return path 14 by a groove formed in its upper surface extending from its end face adjacent to the first block 20 and communicating with the vertical path 2e, 2f. A U-shaped rib 46 is formed on this end face of the horizontal leg 21b for fitting engagement with the groove 37 formed in the first block 20. These blocks 20, 21 are connected together by an ultrasonic welding. A pair of tabs 47, 48 extend from the vertical leg 21a toward the first block 20 at its opposite sides so as to extend below the horizontal leg 21b, and mate with the opposite lateral sides of the forward portion of the first block 20 in which the detector 5 is received. At this time, a circular rib 49 formed in the face of the vertical leg 21a facing the first block engages the circular groove 35 formed in the first block, these parts being connected together by an ultrasonic welding. A slot 57 is formed intermediate the tab 48 and the horizontal leg 21b so as to receive the magnetic yoke 30. Part of the common path 2c is formed in the second block 21 and is located centrally inside the circular rib 49 so as to communicate with that portion of the common path 2c which is formed in the first block 20 when the both blocks are connected together. The vertical paths 2e, 2f extend to a position below the common path 2c, forming a pair of liquid reservoirs 50, 51 (51 being not shown). In order to provide the check valve 11 within the vertical paths 2e, 2f, the upper one-half of each vertical path 2e, 2f has an increased diameter and receives a cylindrical body 52. A restriction 12a is formed on the inner wall of the cylindrical body 52 disposed within the vertical path 2e, and a ball 13a is disposed below the restriction. As indicated in FIG. 13, in the region of the cylindrical body 52 which projects into the return path 14, it is partially notched along one-half circumference thereof which is located nearer the first block 20. A flute 53 is formed in the inner wall of the cylindrical body 52 across its length, and another flute 54 is formed in the bottom portion of the vertical path 2e in communication with the first mentioned flute 53. These flutes 53, 54 are constructed so that the liquid can not reach the bottom of these flutes. It will be appreciated that the vertical path 2f is similarly associated with cylindrical body 52, flutes 53, 54, restriction 12b and ball 13b.

Figure 12:
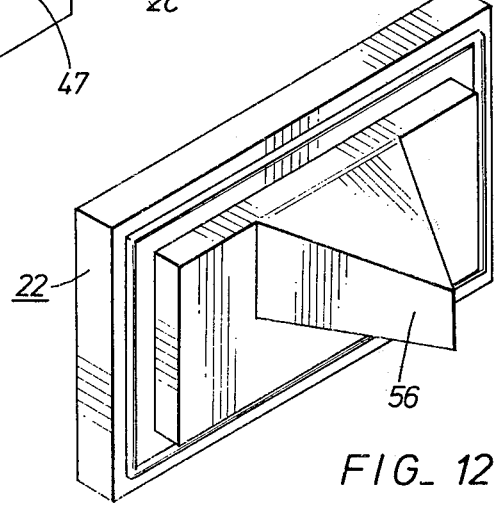
FIG. 12 is a perspective view of a third block.

As indicated in FIGS. 2, 5 and 9, a slot 55 is formed in the sidewall of the second block 21 which is remote from the first block 20 and communicates with the vertical paths 2e, 2f. The third block 22 shown in FIG. 12 is fitted into the slot 55. On its inner surface, the third block 22 is integrally formed with a triangular projection 56 which has its tip disposed in opposing relationship with and extending into the common path 2c within the second block 21, thus defining the pair of branch paths 2a, 2b. An annular rib and an annular groove are formed in the flange portion of the third block 22 and the second block 21, respectively, for fitting engagement and for integral connection by way of an ultrasonic welding. A lid 23 is placed on top of the first and second blocks 20, 21. In its inner surface, the lid 23 is peripherally provided with ribs 60 which engage the groove 36 in the top face of the first block 20 and a groove 61 formed in the top face of the second block 21 for connecting these parts together by way of an ultrasonic welding. The lid 23 and the first and second blocks 20, 21 define the return path 14. The first to third blocks 20, 21, 22 and the lid 23 can be molded from a thermosetting resin such as polyacetal or polycarbonate resin.

The described arrangement operates in the similar manner as mentioned in connection with FIG. 1 in that the liquid 4 can not move through the threshold presetting means 10 for a shock of magnitude which is less than a given value, thus preventing a detection of the shock, but allowing a flow of the liquid 4 through the threshold presetting means 10 in response to a shock of magnitude exceeding the given value to thereby generate a voltage in accordance with the velocity of such flow. When the liquid has moved past the threshold presetting means and returned to the vertical paths 2e, 2f through the return path 14, the air trapped between the vertical paths 2e, 2f is vented upwardly through the flutes 53, 54, thereby preventing the air from entering the common path 2c. In this manner, the presence of the air adjacent to the bottom of the threshold presetting means 10 is prevented, maintaining the latter in contact with the liquid 4 for proper functioning. If the liquid 4 tended to move from the common path 2c toward the vertical paths 2e, 2f, such movement of the liquid is prevented by the check valve 11 because of the failure of the liquid 4 to pass through the flutes 53, 54. If the vessel 1 is inverted during shipment or storage, with the return path 14 located downside, the liquid reservoirs 27, 50, 51 which are located upside at this time serve trapping the air within the vessel 1, again preventing a penetration of the air into the common path 2c. Thus, a rusting of the electrodes 8, 9 which might result from their contact with the air within the vessel to cause a poor electrical contact with the liquid is prevented. If it is desired to avoid the contact of the air with the electrodes 8, 9 when the vessel 1 falls sideways, the liquid reservoirs 27, 50, 51 may be extended laterally. It has been mentioned previously that a flow of the liquid through the flutes cannot occur in response to shocks. However it should be understood that such flow can occur forcibly in response to shocks of greater magnitude. If it is desired to prevent a flow of the liquid in a direction from the detector 5 toward the check valve 11 in response to a shock which causes such movement, the flutes in the check valve 11 are eliminated so that the restrictions 12 can be completely blocked by the balls 13.

In an experiment conducted with a shock sensor constructed in accordance with the second embodiment, when a shock measuring about 11G as shown in FIG. 14A is applied, the shock sensor produced an output as indicated by a curve 68 in FIG. 14B. As shown, the output rises with a slight delay with respect to the shock, and its trailing end is followed by an overshoot in a negative direction which lasted for a short period on the order of 25 milliseconds. When the check valve 11 is not provided, the response is indicated by a curve 69 having a long period of negative excursion followed by an damped oscillation in both positive and negative directions. A comparison of the both curves 68, 69 will clearly show that the shock sensor according to the invention has a very rapid recovery time. In the application of the shock sensor for detection of a collision of automobile, it is generally desired that it detects shocks of magnitude ranging from 10 to 1000 G and frequencies from 20 Hz to 1 KHz depending on the location where it is mounted, but does not respond to shocks of noisy nature less than 4 G. By contrast, in the application to a glass window or door for detection of destruction of the pane, it is desired that shocks of magnitude from 10 to 100 G and frequencies from 10 to 500 Hz be detected, without any response to shocks of noisy nature measuring 1 to 2 G. The shock sensor according to the invention is adapted to satisfy any of these requirements. For detection of destruction of the pane, the branch paths 2a, 2b may be combined into a single rectilinear extension of the common path 2c. It will be noted that the voltage developed across the electrodes 8, 9 is supplied to an electrical circuit, not shown. By electrically connecting the magnetic yoke 30 with a common potential point or ground of the electrical circuit, the apparatus can be made insusceptible to noises.

The shock sensors described above are only adapted to detect shocks applied from one side of the common path 2c, that is, from the side adjacent to the threshold presetting means 10 thereof, and is unable to detect shocks applied from the side of the check valve 11. FIG. 15 shows a further embodiment capable of detecting shocks applied from either direction along the common path 2c. In this arrangement, the opposite ends of the horizontal path 2c are disposed in communication with the vertical paths 2d, 2e intermediate their length, and disposed in the upper portion of the respective vertical paths 2d, 2e are threshold presetting means 10a, 10b, each of which comprises a plurality of parallel and vertically extending slits having a width of 100 microns, for example. A pair of auxiliary vertical paths 2g, 2h are formed in parallel relationship with the respective vertical paths 2d, 2e and communicate with the bottom portion thereof. A pair of check valves 11a, 11b are disposed within the respective auxiliary vertical paths 2g, 2h. The top surface of the threshold presetting means 10a, 10b are inclined downwardly so as to be level with the top surface of the auxiliary vertical paths 2g, 2h at their end adjacent thereto. When a shock of magnitude in excess of a given value is applied in a direction from the vertical path 2d to 2e, the liquid 4 flows through the horizontal path 2c and through the threshold presetting means 10a and enters the auxiliary vertical path 2g. Such liquid flow through the horizontal path 2c permits the shock to be detected. Subsequent to the removal of the shock, the liquid 4 tends to flow toward the vertical path 2e, but such movement is prevented by the presence of the threshold presetting means 10b and the check valve 11b, whereby it resumes a steady-state liquid level only gradually. When a shock of magnitude in excess of the given value is applied in the opposite direction, the liquid 4 passes through the threshold presetting means 10b and enters the auxiliary vertical path 2h. This shock is detected by an output which is produced in accordance with the velocity of flow through the horizontal path 2c.

FIGS. 16 and 17 show another arrangement which permits a detection of shocks applied from any direction. FIG. 16 shows a cross section taken along the line B—B shown in FIG. 17 while FIG. 17 is a cross section taken along the line C—C shown in FIG. 16. As shown, a plurality of radially extending horizontal paths 2a to 2n are provided, and a common vertical path 2m communicates with the respective horizontal paths at their inner end. The other ends of the horizontal paths 2a to 2n are bent upwardly to form respective vertical paths, the top end of which is connected with the common return path 14 as is the top end of the common vertical path 2m. The detector 5 is disposed along the lower portion of the common vertical path 2m, while the threshold presetting means 10 is disposed in the upper portion thereof. Check valves 11 are disposed within the other respective vertical paths, and the liquid 4 is charged so as to fill the portion of the liquid passageway which is defined between the check valves 11 and the threshold presetting means 10. It will be readily appreciated that such an arrangement permits a detection of shocks applied from any direction in the plane which includes the horizontal paths 2a to 2n.

Figure 18:
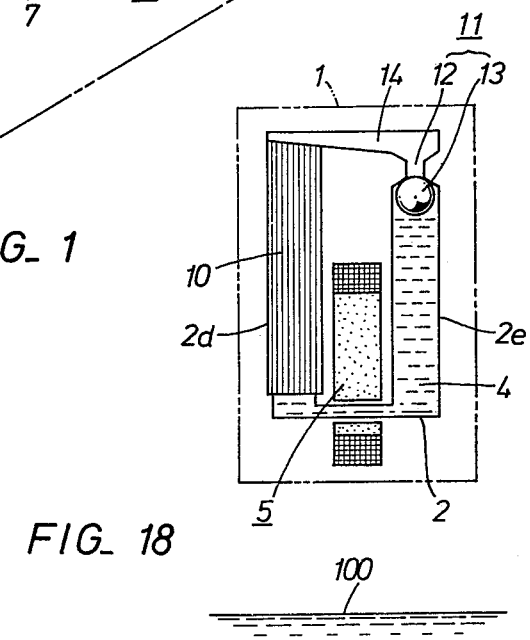
FIG. 18 is a cross section of the shock sensor according to the invention which is capable of detecting shocks applied in the vertical direction.

With the shock sensor of the invention as described above, the constraint imposed on the liquid 4 by the threshold presetting means 10 and the check valve 11 enables a detection of shocks applied in a direction perpendicular to the erath 100, by using an arrangement as shown in FIG. 18. Thus, the pair of vertical paths 2d, 2e are disposed on the opposite sides of the detector 5, the threshold presetting means 10 being disposed in the vertical path 2d and the check valve 11 being disposed in the vertical path 2e. The check valve 11 is substantially spaced vertically from the interface between the threshold presetting means 10 and the liquid 4 in a direction away from the erath 100 so that when the vessel 1 falls onto the erath 100, the liquid 4 flows through the threshold presetting means 10 for detection by the detector 5 if the energy of that portion of the liquid which is located between the check valve and the interface exceeds a given value. Such shock sensor may be mounted on an elevator, for example, for detecting a fall thereof, or may be mounted on a pile or hammer of a pile driver for detecting the intensity of shocks applied.

Figure 19:
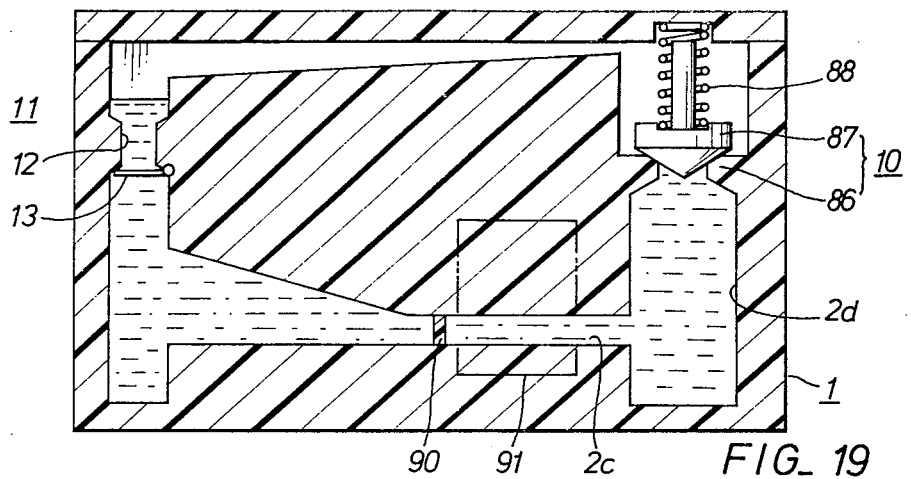
FIGS. 19 and 20 are cross sections illustrating other embodiments of the shock sensor according to the invention.

It will be appreciated that the signal detection means 5, the threshold presetting means 10 and the check valve 11 may have any desired configuration. Several examples will be described below, and it is to be understood that they can be used in a suitable combination. In FIG. 19, the threshold presetting means 10 comprises a valve seat 86 formed in the vertical path 2d, with a valve 87 being urged against the valve seat by means of a coiled spring 88. The signal detection means 5 comprises an upright post 90 which extends across the common path 2c in a direction perpendicular to the direction of flow so as to form Karman's vortex street downstream of the post 90 in response to a flow of the liquid 4. The vortex street is detected by a transducer 91 in the form of pulses, which are in turn counted to provide a determination of the velocity of flow. It will be understood that this is based on the principle of Karman's vortex flowmeter. In this instance, the liquid 4 need not be electrically conductive, and may be electrically nonconductive liquid such as kerosene, polyhydric alcohols such as mixtures of ethylene glycol and water (50%), propylene and water (50%). The check valve 11 comprises a plate-shaped valve 13 which is pivotally mounted at its one end and is normally urged against restriction 12 by virtue of the buoyancy of the liquid 4, but which moves angularly to permit a downward flow of the liquid in response to a flow of the liquid 4 in a direction from the common path 2c toward the vertical path 2d.

Figure 20:
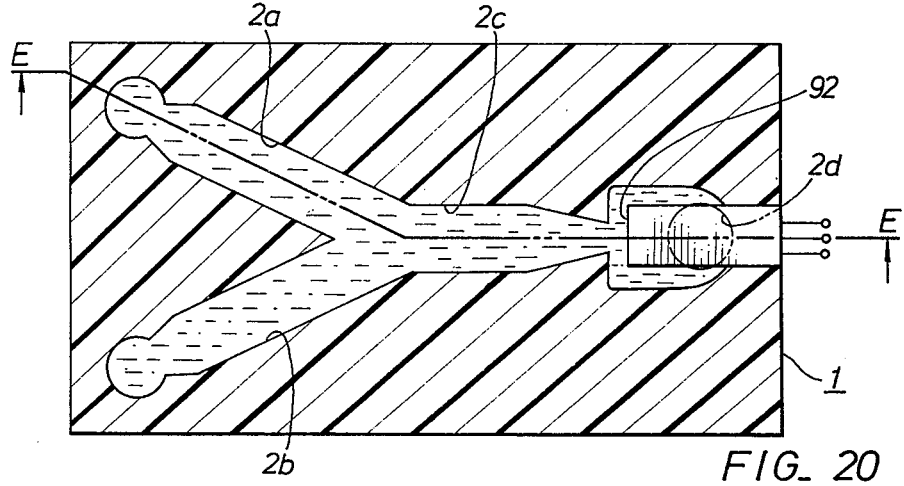
Figure 21:
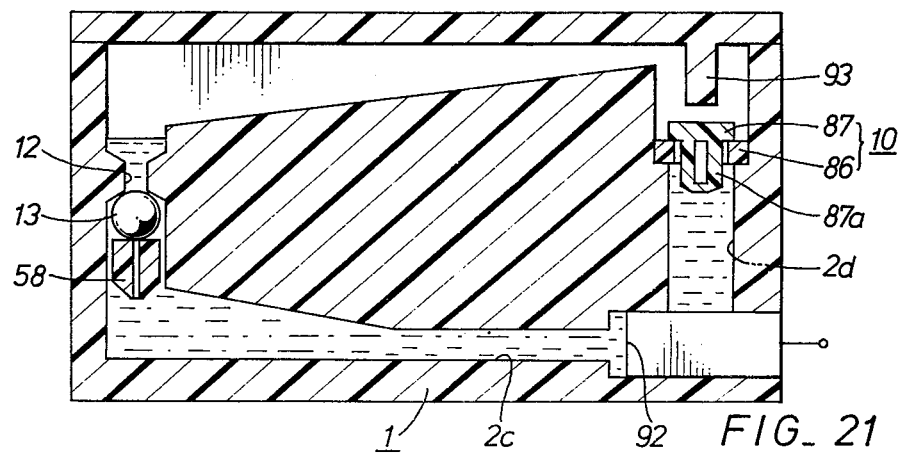
FIG. 21 is a cross section taken along the line E—E shown in FIG. 20.

In FIGS. 20 and 21, the detector 5 is adapted to determine the dynamic pressure of the liquid 4. It comprises a plate-shaped body 92 disposed at right angles to the flow of the liquid 4 within the vertical path 2d, and the dynamic pressure against the body 92 applied by the flow is determined by a strain gauge, for example, which provides an output proportional to the square of the velocity of flow. In order to reduce the influence of the static pressure prevailing before a flow of the liquid occurs, it is preferred that the body 92 be disposed closer to the check valve 11. The threshold presetting means 10 comprises a valve seat 86 formed in the vertical path 2d and a valve 87 disposed therein, both of which are made of a magnetic material. At least one of these members is formed by a permanent magnet so as to establish a threshold value in terms of a magnetic attraction. A guide 87a depends downwardly from the valve 87 so as to project beyond the valve seat 86, and a stop 93 is formed on the inner surface of the lid 23 to prevent the valve 87 from remaining disengaged from the valve seat. To assist in providing the buoyancy to the ball 13, of the check valve 11, it is associated with a float 58 which is disposed below it.

Figure 22:
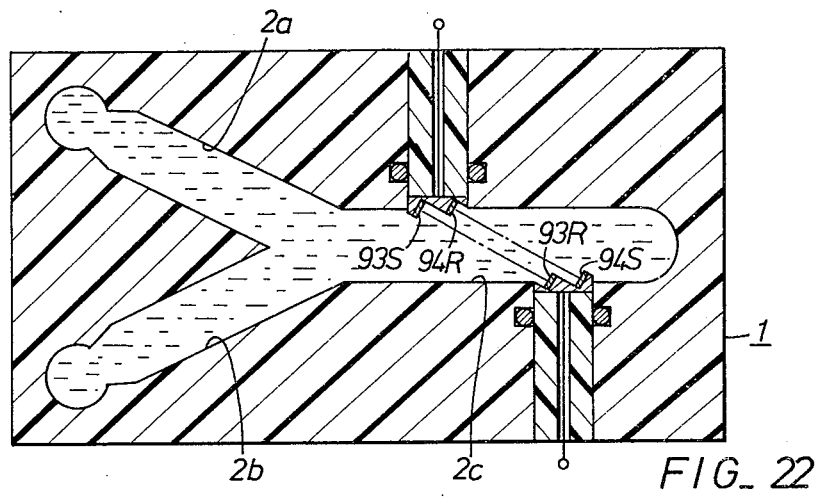
FIGS. 22 to 24 are cross sections showing further embodiments of the shock sensor according to the invention.

FIG. 22 illustrates an acoustic detector 5 which comprises two pairs of ultrasonic transmitters and receivers 93S, 93R and 94S, 94R which are disposed along the common path 2c and offset from each other lengthwise thereof and diametrically. The respective transmitters transmit ultrasonic pulses into the liquid in opposite directions, and upon receiving these pulses, the respective receivers again drive the respective transmitters in accordance with the received output, thus forming a pair of Sing Around systems. A difference in the pulse frequency of the two systems is proportional to the velocity of flow.

Figure 23:
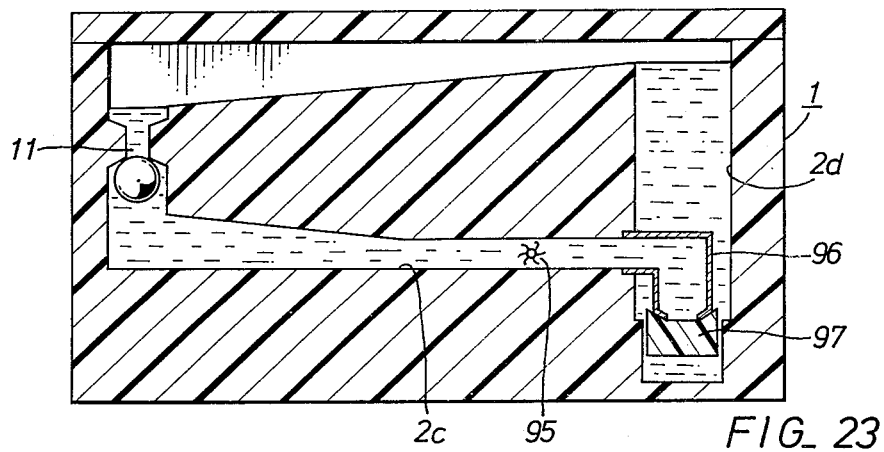

FIG. 23 shows the use of a turbine 95 disposed in the common path 2c for developing a voltage, by rotating in response to the velocity of flow. In this Figure, the threshold presetting means 10 utilizes the buoyancy in that the common path 2c is folded at right angles and extended into that portion of the vertical path 2d which is below the common path 2c, with the lower end of the extension being blocked by a float valve 97. When the pressure of the liquid 4 within the common path 2c exceeds a given value, the float valve 97 is depressed to permit a flow of liquid.

Figure 24:
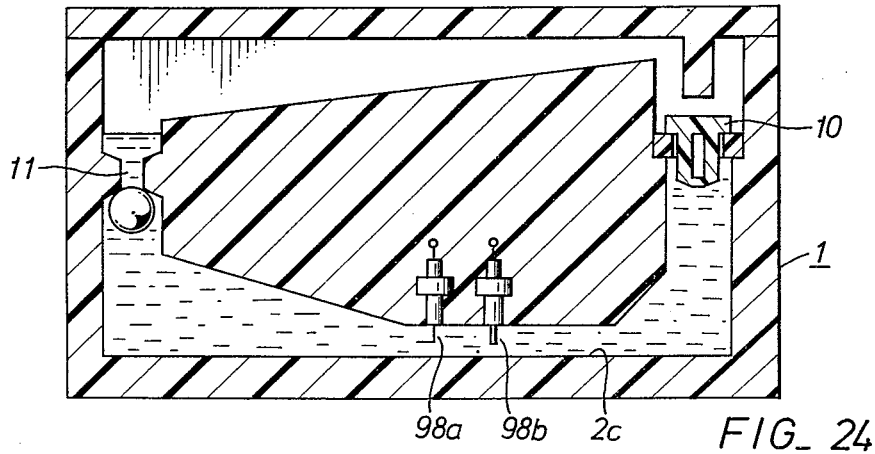

FIG. 24 shows the use of a hot-wire flowmeter which comprises a pair of sensors 98a and 98b disposed in the common path 2c. The resistance of the sensor 98a varies immediately in response to the velocity of a flow as a result of a temperature change while the resistance of the sensor 98b varies with a time delay. A variation in these resistances permits the velocity of the liquid flow to be determined.

Having described the invention, what is claimed is:

1. A shock sensor comprising a liquid passageway formed in a vessel and containing a body of liquid, signal detection means responsive to the velocity of liquid flow for providing a signal, threshold presetting means disposed in the liquid passageway on one side of the signal detection means for permitting the liquid to pass therethrough only when the energy of the liquid tending to move exceeds a given value, a check valve disposed in the liquid passageway on the opposite side of the signal detection means from threshold presetting means for permitting a movement of the liquid in a direction from the signal detection means toward the threshold presetting means while substantially completely preventing a movement thereof in the opposite direction, and a return path for allowing that portion of the liquid which has moved past the threshold presetting means to pass through the check valve in a forward direction.

2. A shock sensor according to claim 1 in which the liquid passageway comprises a horizontal path, and at least one vertical path communicating with at least one end of the horizontal path and extending upwardly therefrom, the check valve being disposed within the vertical path.

3. A shock sensor according to claim 2 wherein there are provided a plurality of horizontal paths extending in different directions substantially in a single horizontal plane and communicating with each other at a single point where they communicate with a common vertical path extending upwardly therefrom, the signal detection means and the threshold presetting means being disposed in the common vertical path, the other end of the respective horizontal paths each communicating with an upwardly extending vertical path, each of the vertical paths being provided with the check valve, the top end of the vertical paths and the top end of the common vertical path being maintained in communication by a common or separate return paths.

4. A shock sensor according to claim 2 in which the check valve comprises a restriction formed in the vertical path, and a valve body urged against the restriction from below by the buoyancy of the liquid for blocking the restriction.

5. A shock sensor according to claim 4, further including a float disposed below the valve body for increasing the buoyancy.

6. A shock sensor according to claim 2, further including a flute formed lengthwise in the vertical path and adapted to prevent an ingress of the liquid thereinto.

7. A shock sensor according to claim 2 in which the opposite ends of the horizontal path communicate with vertical paths in each of which the threshold presetting means and the check valve are disposed in juxtaposition.

8. A shock sensor according to claim 1 in which the liquid is electrically conductive.

9. A shock sensor according to claim 8 in which the conductive liquid is mercury.

10. A shock sensor according to claim 8, further including a liquid reservoir in communication with the liquid passageway for containing air within the vessel therein when the vessel assumes a position different from that assumed by the vessel for normal operation.

11. A shock sensor according to claim 8 in which the signal detection means comprises means for producing a magnetic field across the liquid passageway in a direction substantially perpendicular to the length of the passageway, and a pair of electrodes disposed within the liquid passageway and spaced apart in a direction substantially perpendicular to both the magnetic field and the length of the liquid passageway.

12. A shock sensor according to claim 1 in which the threshold presetting means comprises a number of small apertures for preventing a passage of the liquid therethrough at a liquid pressure which is below a given value.

13. A shock sensor according to claim 1 in which the threshold presetting means comprises a magnet valve which closes the liquid passageway by magnetic attraction, but which is opened when the energy of the liquid tending to move exceeds the given value.

14. A shock sensor according to claim 2 in which the distance between the check valve and the interface between the threshold presetting means and the liquid as measured in the lengthwise direction of the vertical path is chosen large enough to permit a response to a shock applied in the lengthwise direction of the vertical path.

* * * * *